United States Patent [19]
Kohno et al.

[11] Patent Number: 5,791,084
[45] Date of Patent: Aug. 11, 1998

[54] METHOD FOR MAKING A GEL OF GEL-COAT SEED EASILY DISINTEGRABLE

[75] Inventors: Yasushi Kohno, Shizuoka; Masayoshi Minami; Riichi Minamiguchi, both of Osaka, all of Japan

[73] Assignee: Yazaki Corporation, Tokyo, Japan

[21] Appl. No.: 933,748

[22] Filed: Sep. 23, 1997

Related U.S. Application Data

[62] Division of Ser. No. 662,084, Jun. 12, 1996, Pat. No. 5,706,602.

[30] Foreign Application Priority Data

Jun. 15, 1995 [JP] Japan ................... 7-148670

[51] Int. Cl.$^6$ ............... A01C 1/06; A01C 21/00; A01C 1/00; A01B 79/00; A01G 5/06; A01N 1/00; A01N 3/00
[52] U.S. Cl. ............... 47/57.6; 47/58; 427/4
[58] Field of Search .................. 47/57.6, 58; 427/4

[56] References Cited

U.S. PATENT DOCUMENTS

| | | | |
|---|---|---|---|
| 4,806,357 | 2/1989 | Garrett et al. | 427/4 |
| 4,808,430 | 2/1989 | Kouno | 427/4 |
| 5,080,925 | 1/1992 | Kouno | 427/4 |
| 5,254,358 | 10/1993 | Kouno | 427/4 |
| 5,572,827 | 11/1996 | Conrad | 47/57.6 |

FOREIGN PATENT DOCUMENTS

WO8701258  3/1987  WIPO.

*Primary Examiner*—David T. Fox
*Assistant Examiner*—Kent L. Bell
*Attorney, Agent, or Firm*—Sughrue, Mion, Zinn, Macpeak & Seas, PLLC

[57] ABSTRACT

A method for making a gel coat of gel-coated seed easily disintegrable, in which the gel-coated seed has an aqueous gel layer water-insolubilized with a metal ion, wherein the method comprises blocking the insolubilizing action of the metal ion with a sequestering agent.

6 Claims, No Drawings

000
METHOD FOR MAKING A GEL OF GEL-COAT SEED EASILY DISINTEGRABLE

CROSS REFERENCE TO RELATED APPLICATIONS

This is a divisional of application Ser. No. 08/662,084 filed Jun. 12, 1996, now U.S. Pat. No. 5,706,602.

FIELD OF THE INVENTION

The present invention relates to improvement of disintegrability of the gel coat of gel-coated seeds of plants and the related techniques.

BACKGROUND OF THE INVENTION

It is known that coating of seeds with gel facilitates planting the seeds in the ground and is effective to accelerate germination as described in WO 87/01258. The present inventors of the present invention have participated in the development of this technique and made various inventions as disclosed, e.g., in JP-A-63-209502 (the term "JP-A" as used herein means an "unexamined published Japanese patent application"), JP-A-63-68008, and JP-A-5-56707.

The techniques comprise coating seeds with gel, which is insolubilized in water with metal ions, e.g., calcium ion, so as to have a uniform size and an appropriately controlled hardness. The techniques have made it feasible to mechanize planting of even those seeds that are too small to be planted mechanically.

However, the "hardness" of the gel coat of the gel-coated seeds according to these conventional techniques, though advantageous in planting, has tended to prevent the seeds from germinating because germs must pierce through the hard gel-coat in germinating.

The gel coat sometimes gets harder by the action of metal ions which are present in the soil in which the seeds are planted, e.g., the above-mentioned calcium ion. Therefore, it has been demanded to establish a method for treating the gel coat to make it easily disintegrable.

In order to solve the above problem, it has been proposed to physically make cuts into the gel coat with a knife and the like at the time of seeding, but such often damages the seed and offers no practical and definite solution to the outstanding problems.

SUMMARY OF THE INVENTION

In the light of the above-mentioned disadvantages of conventional techniques, an object of the present invention is to provide a method for treating gel-coated seeds to make the gel coat easily disintegrable.

This and other objects of the present invention have been accomplished by a method for making a gel coat of gel-coated seed easily disintegrable, in which the gel-coated seed has an aqueous gel layer water-insolubilized with a metal ion, wherein the method comprises blocking the insolubilizing action of the metal ion with a sequestering agent.

Furthermore, this and other objects of the present invention have been accomplished by a gel-coated seed having an aqueous gel layer water-insolubilized with a metal ion, which comprises a sequestering agent which blocks the insolubilizing action of the metal ion.

DETAILED DESCRIPTION OF THE INVENTION

Examples of the sequestering agent which can be used in the invention include ion exchangers which exchange the metal ion insolubilizing the aqueous gel layer of gel-coated seeds with other ions; chelating agents forming a chelate compound with metal ions; and compounds capable of severing the crosslinkage of the three-dimensional network structure of the aqueous gel layer. Specific examples thereof include sodium or potassium tripolyphosphate (triphosphate), sodium or potassium hexametaphosphate, polycarboxylic acids (e.g., ethylenediamine-tetraacetic acid), and hydroxycarboxylic acids (e.g., citric acid).

Among these sequestering agents, sodium or potassium tripolyphosphate (triphosphate), and sodium or potassium hexametaphosphate are preferred for the following reasons. They act on the network structure of the gel itself to sever the linkage, thereby blocking the insolubilizing action possessed by the metal ion to produce considerable effects at smaller amounts than other sequestering agents. Accordingly, they cause little hinderance such as salt damage, the gel disintegrates rapidly, and the cost can be reduced.

In a preferred embodiment of the present invention, the sequestering agent is pre-contained in the insolubilized aqueous gel layer in an encapsulated form as a microcapsule and is then released from the microcapsule. Gel-coated seeds according to this embodiment greatly save the labor of sowing and are easy to handle.

If the microcapsule comprises gel, the rate of disintegration can be easily controlled by the adjustment of the conditions, e.g., the water content of the gel constituting the microcapsule, the concentration of the sequestering agent, the size of the microcapsule.

The microcapsules of the sequestering agent can be prepared by applying generally known encapsulation techniques. Preparation of microcapsules is easier as described below if in using, as an encapsulant, materials capable of forming thermally reversible gel, i.e., those which melt in warm water and become jelly on cooling, such as gelatin, agar, carrageenan, and higher fatty acid esters. That is, a thermally reversible gel-forming material is dissolved in warm water, and the solution is sprayed onto a solution of a sequestering agent, whereby the sprayed droplets are cooled to form microcapsules containing the sequestering agent.

The microcapsules preferably have such a size that can be dispersed uniformly throughout the gel layer of the gel-coated seeds, i.e., 0.1 to 0.5 mm in diameter (long axis length). While depending on the concentration of the sequestering agent in the microcapsules and the amount of the microcapsules added to the gel layer, larger microcapsules generally cause the gel layer to disintegrate more rapidly, and smaller microcapsules generally cause the gel layer to disintegrate more slowly. Furthermore, the rate of disintegration of the gel coat can be controlled arbitrarily through selection of the encapsulating gel-forming material, the concentration thereof, and the kind and concentration of the sequestering agent.

The thus prepared microcapsules containing a sequestering agent are incorporated into the gel layer either simultaneously with or separately from coating of a seed with the gel layer. For example, the microcapsules can be previously applied by powder coating to the surface of seeds to be coated with gel or can be previously incorporated into the gel layer apart from the seed. The latter method is preferred because the microcapsules can be uniformly dispersed in the gel coat so that disintegration of the gel coat proceeds uniformly and rapidly.

The gel coat can be formed in a known manner. For example, a droplet of a coating gel solution is formed at the tip of a capillary, and the microcapsules and a seed are introduced into the droplet by using the capillary. The gel droplet is then dropped in a solution containing a metal ion having an action of water-insolubilizing the gel. The concentration of the metal ion solution or the contact time with the metal ion solution are adjusted so as to form a gel coat having a controlled hardness (breaking load) suited to the conditions, e.g., sowing conditions. Examples of the material forming aqueous gel include sodium alginate and sodium polyacrylate. Other examples thereof include guar gum which reacts with a boric ion, anionic thickeners such as CMC, and carrageenan which reacts with a potassium ion.

The rate of disintegration of the gel coat can be controlled by adjusting the total amount of the sequestering agent in the gel coat. However, it is required that the amount of the sequestering agent be 20% by weight or less and greater than 0% by weight based on the gel-coated seed. If it exceeds 20% by weight, interference with germination would result. Furthermore, the concentration of the sequestering agent used in a solution is preferably 0.1% by weight or more.

Of the gel-coated seeds containing the sequestering agent in the gel coat, those in which the sequestering agent is encapsulated in gel microcapsules can be stored as such for a few days until germination is to be started, while the permissible storage time varies depending on the conditions of preparation, the storage temperature, and the kind of seeds. Furthermore, it is also possible to accelerate germination. The permissible storage time can be extended to some degree by refrigeration.

Immediately before planting, the gel-coated seeds are warmed at about 40° C. or more to let the gel coat start disintegrating and immediately thereafter planted in the ground.

The temperature at which to start disintegration of the gel coat should not be such that adversely affects germination, namely, should be lower than 60° C. Accordingly, in the preparation of thermally reversible microcapsules, the microcapsules should be designed so that the gel coat may start disintegrating below 60° C. but may not start disintegrating at a storage temperature (about 0° to 35° C.).

The warming treatment of the gel-coated seeds can be carried out by application of warm air or immersion in warm water. Immersion in warm water is preferred for convenience. It is necessary to plant the seeds immediately after the warming treatment; for the gel-coated seeds in which disintegration of the gel layer has proceeded to some extent are no more suited to mechanized planting.

According to the method of the invention for making a gel layer of gel-coated seeds easily disintegrable, there are provided gel-coated seeds, the aqueous gel layer of which having been water-insolubilized with a metal ion, in which the insolubilizing action of the metal ion can be blocked by a sequestering agent, whereupon the gel layer becomes water-soluble and disintegrates. Therefore, the gel layer treated by the method does not prevent the seeds from germinating and piercing therethrough.

The present invention will now be illustrated in greater detail with reference to the following examples, but it should be understood that the present invention is not deemed to be limited thereto. Unless otherwise indicated, all parts and percents are by weight.

EXAMPLES 1 AND 2 AND COMPARATIVE EXAMPLES 1 AND 2

Two hundred parts of a 3% aqueous solution of gelatin (50° C.) were sprayed with a spray onto 100 parts of a 10% aqueous solution of sodium tripolyphosphate as a sequestering agent to prepare thermally reversible spherical microcapsules containing the sequestering agent and having a diameter of 0.5 mm.

A droplet of a 3% sodium alginate aqueous solution was formed, and the microcapsules were introduced into the droplet together with a seed of Japanese radish by using a capillary. Each droplet containing one seed was dropped in a 10% aqueous solution of calcium chloride to prepare water-insolubilized gel-coated seeds having a diameter of 10 mm. The contact time of the droplets with the calcium chloride aqueous solution was 20 seconds (Example 1) or 40 seconds (Example 2) to obtain two kinds of gel-coated seeds differing in breaking load.

For comparison, gel-coated seeds were prepared in the same manner as described above, except that the- microcapsules were not introduced into the droplet (Comparative Examples 1 and 2).

A hundred gel-coated seeds thus prepared were kept at 40° C. in a thermostat, and change in breaking load with time was examined.

The breaking load was measured with a rheometer equipped with a 2 kgf load cell. In more detail, filter paper for non-slip was placed on the lower disc stage of the measuring part of the rheometer, and a sample gel-coated seed was put thereon. The lower stage was lifted to crush the sample by compression with the upper disc stage. A breaking strength was obtained from the stress-strain curve. Measurement was made for 20 samples of the same kind to obtain an average. The results obtained are shown in Table 1 below.

TABLE 1

| | Breaking Strength (kgf) | | | |
|---|---|---|---|---|
| | Example 1 | Example 2 | Compara. Example 1 | Compara. Example 2 |
| Initial | 0.48 | 0.99 | 0.51 | 0.98 |
| After 1 hour | 0.22 | 0.61 | 0.49 | 0.98 |
| After 2 hours | unmeasurable* | 0.30 | 0.47 | 0.99 |
| After 3 hours | unmeasurable** | 0.18 | 0.50 | 0.97 |
| After 4 hours | unmeasurable** | unmeasurable* | 0.51 | 0.96 |

Notes:
*Part of the gel disintegrated.
**The gel completely disintegrated.

The results in Table 1 show that the gel-coated seeds which had not been subjected to the treatment for easy disintegration (Comparative Examples 1 and 2) were hard all the time, while the gel layer of the gel-coated seeds having been rendered easily disintegrable by the method of the invention (Examples 1 and 2) disintegrated in a short time. In other words, the present invention manifests its effect more appreciably when applied to gel-coated seeds whose gel coat exhibits higher hardness (i.e., higher breaking load) immediately after the preparation.

A germination test of the gel-coated seeds of Examples 1 and 2 and Comparative Examples 1 and 2 was conducted as follows. Four hundred gel-coated seeds of the same kind were immersed in warm water at 50° C. for 1 hour to allow the gel coat to start disintegrating and then maintained at 25° C. in a thermostat. The number of the seeds which germinated (hereinafter referred to as a) and the number of the seeds which stuck the root out of the gel coat (hereinafter referred to as b) were counted with time. The results obtained are shown in Table 2 below. The term "stick out" as used herein means that the gel coat turns liquid on disintegrating and the seed stick its root out of the liquid coat.

TABLE 2

|  | Example 1 | | Example 2 | | Compara. Example 1 | | Compara. Example 2 | |
| --- | --- | --- | --- | --- | --- | --- | --- | --- |
|  | a | b | a | b | a | b | a | b |
| 1 day | 0 | 0 | 0 | 0 | 0 | 0 | 0 | 0 |
| 2 days | 272 | 38 | 283 | 41 | 267 | 35 | 173 | 0 |
| 3 days | 356 | 98 | 353 | 88 | 350 | 90 | 198 | 0 |
| 4 days | 372 | 243 | 376 | 236 | 369 | 233 | 218 | 6 |
| 5 days | 380 | 285 | 380 | 281 | 377 | 277 | 265 | 8 |
| 6 days | 381 | 324 | 380 | 319 | 385 | 322 | 278 | 12 |
| 7 days | 381 | 348 | 384 | 327 | 388 | 331 | 283 | 12 |

Note: The seeds which withered to die were not counted.

The results in Table 2 show that the gel-coated seeds of the invention exhibit a very high rate of "sticking out" or "piercing" since the gel coat disintegrates easily. The seeds of Example 2, whose breaking load immediately after the preparation is as high as that of the seeds of Comparative Example 2, also exhibit a very high rate of sticking out.

It has now been proved that the gel-coated seeds treated by the method of the invention possess sufficient strength necessary for sowing operation (in general, a breaking load of 0.4 kgf or more, while varying depending on the type of a sowing machine (called a seed drill)) and the gel coat rapidly disintegrates after sowing.

This advantage is particularly pronounced where the gel-coated seeds have a high breaking load suitable for mechanized planting.

EXAMPLES 3 AND 4 AND COMPARATIVE EXAMPLES 3 AND 4

Three hundred parts of a 1% aqueous solution of carrageenan heated at 60° C. were sprayed with a spray onto 100 parts of a 50% aqueous solution of sodium hexametaphosphate as a sequestering agent to prepare thermally reversible spherical microcapsules containing the sequestering agent and having a diameter of 0.4 mm.

A droplet of a 3% sodium alginate aqueous solution was formed, and the microcapsules were introduced into the droplet together with a seed of Japanese radish by using a capillary. Each droplet containing one seed of Japanese radish was dropped in a 10% aqueous solution of calcium chloride to prepare water-insolubilized gel-coated seeds having a diameter of 10 mm. The contact time of the droplets with the calcium chloride aqueous solution was 20 seconds (Example 3) or 40 seconds (Example 4) to obtain two kinds of gel-coated seeds differing in breaking load.

For comparison, gel-coated seeds were prepared in the same manner as described above, except that the microcapsules were not introduced into the droplet (Comparative Examples 3 and 3).

A hundred gel-coated seeds thus prepared were kept at 40° C. in a thermostat, and change in breaking load with time was examined under the same conditions as in Example 1. The results obtained are shown in Table 3 below.

TABLE 3

Breaking Strength (kgf)

|  | Example 3 | Example 4 | Compara. Example 3 | Compara. Example 4 |
| --- | --- | --- | --- | --- |
| Initial | 0.50 | 1.00 | 0.50 | 1.01 |
| After 1 hour | 0.30 | 0.81 | 0.51 | 0.99 |
| After 2 hours | unmeasurable* | 0.52 | 0.47 | 0.99 |
| After 3 hours | unmeasurable** | 0.28 | 0.48 | 1.00 |
| After 4 hours | unmeasurable** | unmeasurable* | 0.51 | 0.98 |

Notes:
*Part of the gel disintegrated.
**The gel completely disintegrated.

A germination test of the gel-coated seeds of Examples 3 and 4 and Comparative Examples 3 and 4 was conducted in the same manner as in Example 1. The results obtained are shown in Table 4 below.

TABLE 4

|  | Example 3 | | Example 4 | | Compara. Example 3 | | Compara. Example 4 | |
| --- | --- | --- | --- | --- | --- | --- | --- | --- |
|  | a | b | a | b | a | b | a | b |
| 1 day | 0 | 0 | 0 | 0 | 0 | 0 | 0 | 0 |
| 2 days | 298 | 56 | 301 | 54 | 289 | 59 | 169 | 0 |
| 3 days | 362 | 114 | 366 | 106 | 353 | 101 | 250 | 0 |
| 4 days | 380 | 272 | 382 | 266 | 378 | 268 | 288 | 11 |
| 5 days | 387 | 308 | 389 | 299 | 380 | 301 | 291 | 11 |
| 6 days | 387 | 333 | 388 | 325 | 385 | 329 | 290 | 14 |
| 7 days | 386 | 361 | 388 | 351 | 388 | 357 | 295 | 14 |

Note: The seeds which withered to die were not counted.

As can be seen from Tables 3 and 4, the thermally reversible microcapsules prepared by using sodium hexametaphosphate as a sequestering agent and carrageenan as a gel-forming material produce the same effects as observed in Examples 1 and 2 in which sodium tripolyphosphate and gelatin were used.

The results of Tables 3 and 4 also reveal that the invention is more effective for gel-coated seeds with a harder gel coat (a higher breaking load) suitable for mechanized planting.

EXAMPLES 5 AND 6 AND COMPARATIVE EXAMPLES 5 AND 6

A 10% aqueous solution of sodium tripolyphosphate to which sodium alginate had been added so as to have a viscosity of 2000 mpa.s at 25° C. was spray coated onto seeds of Japanese radish with a spray and dried at room temperature for 24 hours.

The seeds coated with a layer containing sodium tripolyphosphate as a sequestering agent were introduced into a droplet of a 3% sodium alginate aqueous solution by using a capillary, and each droplet containing the seed was dropped in a 10% aqueous solution of calcium chloride to prepare water-insolubilized gel-coated seeds.

The contact time of the droplets with the calcium chloride aqueous solution was 20 seconds (Example 5) or 40 seconds (Example 6) to obtain two kinds of gel-coated seeds differing in breaking load.

For comparison, gel-coated seeds were prepared in the same manner as described above, except that the microcapsules were not introduced into the droplet (Comparative Examples 5 and 6).

The gel-coated seeds had a diameter of 10 mm, and the number of Japanese radish seed in one droplet was one.

A hundred gel-coated seeds thus prepared were kept at 25° C. in a thermostat, and change in breaking load with time was examined under the same conditions as in Example 1. The results obtained are shown in Table 5.

TABLE 5

| | Breaking Strength (kgf) | | | |
|---|---|---|---|---|
| | Example 5 | Example 6 | Compara. Example 5 | Compara. Example 6 |
| Initial | 0.53 | 1.03 | 0.51 | 1.01 |
| After 1 hour | 0.37 | 0.87 | 0.50 | 1.00 |
| After 2 hours | 0.21 | 0.46 | 0.49 | 1.03 |
| After 3 hours | unmeasurable* | 0.28 | 0.52 | 0.99 |
| After 4 hours | unmeasurable** | unmeasurable* | 0.52 | 1.05 |

Notes:
*Part of the gel disintegrated.
**The gel completely disintegrated.

A germination test of the gel-coated seeds of Examples 5 and 6 and Comparative Examples 5 and 6 was conducted in the same manner as in Example 1. The results obtained are shown in Table 6 below.

TABLE 6

| | Example 5 | | Example 6 | | Compara. Example 5 | | Compara. Example 6 | |
|---|---|---|---|---|---|---|---|---|
| | a | b | a | b | a | b | a | b |
| 1 day | 0 | 0 | 0 | 0 | 0 | 0 | 0 | 0 |
| 2 days | 266 | 29 | 279 | 32 | 260 | 34 | 169 | 0 |
| 3 days | 343 | 87 | 340 | 79 | 344 | 94 | 196 | 0 |
| 4 days | 375 | 242 | 380 | 237 | 367 | 231 | 207 | 0 |
| 5 days | 383 | 288 | 382 | 284 | 379 | 269 | 258 | 3 |
| 6 days | 384 | 321 | 380 | 326 | 381 | 300 | 270 | 6 |
| 7 days | 384 | 337 | 382 | 331 | 381 | 335 | 277 | 7 |

Note: The seeds which withered to die were not counted.

In Examples 5 and 6, since the microcapsules containing sodium tripolyphosphate as a sequestering agent are present only on the surface of the radish seeds, it takes time for sodium tripolyphosphate to diffuse throughout the gel layer. Although the gel layer is slightly slow in disintegrating for this reason, disintegration of the gel proceeds sooner or later. It is thus seen that the gel coat does not interfere with germination and the root's sticking out.

The results of Examples 5 and 6 in view of Comparative Examples 5 and 6 also reveal that the invention is more effective for gel-coated seeds with a harder gel coat (a higher breaking load).

In Examples 5 and 6, the sequestering agent is applied on the surface of seeds unlike Examples 1 to 4. According to this method, the commencement of disintegration of the gel coat is uncontrollable, and the gel coat begins to disintegrate at around 25° C. Therefore, this method cannot be applied to those seeds which should be treated for germination acceleration.

While the foregoing Examples have been described with reference to the seeds of Japanese radish, the seeds of Japanese radish were chosen simply because they have high rate of germination so that the effects of the present invention are noticeably manifested. It is needless to say that the present invention is effective on other seeds as well.

The gel-coated seeds having been subjected to the treatment of the invention possess all the advantages of conventional gel-coated seeds, and yet the gel layer completely disintegrates after being planted and does not interfere with germination of the seeds, thereby exhibiting a high rate of germination and a high rate of sticking out.

While the invention has been described in detail and with reference to specific examples thereof, it will be apparent to one skilled in the art that various changes and modifications can be made therein without departing from the spirit and scope thereof.

What is claimed is:

1. A gel-coated seed having an aqueous gel layer water-insolubilized with a metal ion,
    wherein the gel-coated seed comprises a sequestering agent which blocks the insolubilizing action of the metal ion,
    wherein the sequestering agent is pre-contained in the insolubilized aqueous gel layer in an encapsulated form as a microcapsule and is then released from the microcapsule.

2. The gel-coated seed as claimed in claim 1, wherein the sequestering agent is selected from the group consisting of sodium tripolyphosphate, potassium tripolyphosphate, sodium hexametaphosphate, potassium hexametaphosphate, polycarboxylic acid, and hydroxycarboxylic acid.

3. The gel-coated seed as claimed in claim 1, wherein the sequestering agent is used in an amount of 20% by weight or less based on the gel-coated seed.

4. The gel-coated seed as claimed in claim 1, wherein the microcapsule comprises a thermally reversible gel.

5. The gel-coated seed as claimed in claim 1, wherein the microcapsule has a diameter of from 0.1 to 0.5 mm.

6. The gel-coated seed as claimed in claim 4, wherein the thermally reversible gel is selected from the group consisting of gelatin, agar, carrageenan, and a higher fatty acid ester.

* * * * *